United States Patent
Hepler et al.

(10) Patent No.: US 6,481,198 B1
(45) Date of Patent: Nov. 19, 2002

(54) MULTI-STAGE ROCKET MOTOR ASSEMBLY INCLUDING JETTISONABLE LAUNCH MOTOR INTEGRATED WITH FLIGHT IGNITER

(75) Inventors: Sheryl H. Hepler, Ogden, UT (US); Herman L. Miskelly, Manassas, VA (US); Mark C. Horton, Lakeland, FL (US)

(73) Assignee: Alliant Techsystems Inc., Edina, MN (US)

( * ) Notice: Subject to any disclaimer, the term of this patent is extended or adjusted under 35 U.S.C. 154(b) by 11 days.

(21) Appl. No.: 09/604,679

(22) Filed: Jun. 27, 2000

Related U.S. Application Data

(60) Provisional application No. 60/142,927, filed on Jul. 9, 1999.

(51) Int. Cl.$^7$ .................................................. F02C 9/00
(52) U.S. Cl. ................................................ 60/245; 60/256
(58) Field of Search ........................... 60/225, 244, 245, 60/251, 256

(56) References Cited

U.S. PATENT DOCUMENTS

| | | | | |
|---|---|---|---|---|
| 2,883,829 A | 4/1959 | Africano | ...................... | 60/35.6 |
| 2,912,820 A | 11/1959 | Whitmore | ...................... | 60/35.6 |
| 3,104,523 A | * 9/1963 | O'Donnell | ..................... | 60/245 |
| 3,115,008 A | 12/1963 | Cohen et al. | ................. | 60/35.6 |
| 3,279,187 A | 10/1966 | Lindman | ...................... | 60/245 |
| 3,286,472 A | 11/1966 | Thurston | ...................... | 60/256 |
| 3,446,022 A | 5/1969 | Olliff, Jr. et al. | .............. | 60/256 |
| 4,631,916 A | 12/1986 | Le Tanter et al. | ............. | 60/245 |
| 4,751,881 A | 6/1988 | Fauconnier et al. | ......... | 102/202 |
| 4,798,142 A | 1/1989 | Canterberry et al. | ......... | 102/290 |
| 4,972,673 A | 11/1990 | Carrier et al. | ................. | 60/245 |
| 5,007,236 A | 4/1991 | Myers et al. | .................. | 60/256 |
| 5,070,691 A | 12/1991 | Smith et al. | ................... | 60/245 |

* cited by examiner

Primary Examiner—Louis J. Casaregola
(74) Attorney, Agent, or Firm—Sullivan Law Group

(57) ABSTRACT

This multi-stage rocket motor assembly includes, a one main motor subassembly and a launch motor subassembly. The flight igniter of the main motor subassembly is integrated with the launch motor subassembly to permit the flight igniter to be jettisoned essentially in unison with the launch motor subassembly.

17 Claims, 2 Drawing Sheets

MULTI-STAGE ROCKET MOTOR ASSEMBLY INCLUDING JETTISONABLE LAUNCH MOTOR INTEGRATED WITH FLIGHT IGNITER

RELATED APPLICATIONS

Priority is claimed of provisional application 60/142,927 filed in the U.S. Patent & Trademark Office on Jul. 9, 1999, the complete disclosure of which is incorporated herein by reference.

BACKGROUND OF THE INVENTION

1. Field of the Invention

This invention relates to multi-stage rocket motor assemblies (e.g., for missiles) having at least one of its stages capable of being jettisoned in flight, and especially to multi-stage rocket motors having a jettisonable flight motor stage and launch motor stage.

2. Description of the Related Art

Dual-stage rocket motor assemblies are well known in the industry and have found various practical applications, most commonly in connection with their use as the propulsive impulse systems of guided and unguided missiles. As understood in the art and referred to herein, a multi-stage rocket motor assembly includes at least the following two stages. First, a launch motor subassembly provides thrust for lift-off or, in the case of a canister-launched missile, ejection from the canister, and optionally for initial flight. Alternatively, in the case of a boost motor subassembly, the propulsive force for the initial flight of an aircraft-launch rocket motor assembly can be provided by the boost motor subassembly. Second, a main motor subassembly is actuated after depletion of the launch motor subassembly propellant and supplies at least a portion of the flight propulsion to the rocket motor assembly. In the case of a boost/sustain motor, the main motor commonly functions as the sustain stage.

Multi-stage rocket motor assemblies are well known and have been accepted for various applications. One example of an application for dual-stage rocket motors is the use of such rocket motors in canister-launched missiles. The launch motor subassembly provides the initial impulse for expelling the missile from the canister to a sufficient distance to permit ignition of the main motor subassembly without danger of injury to the operator and/or launcher. Additionally, multi-stage rocket motor assemblies have also been used for anti-aircraft missiles. The efficiency with which an anti-aircraft missile is able to intercept an aircraft can be increased by imparting an additional impulse from the main motor subassembly immediately prior to final targeting and intercepting of the intended target. The additional impulse increases the maneuverability of the missile and reduces the period available to the intended target for making last, second evasive adjustments. Another example of a situation in which dual-stage rocket motors have been used is where a boost/sustain function is desired, such as for travelling over long flight distances and for aircraft-launched rocket motor assemblies. In a boost/sustain system, the launch motor subassembly contains a boost propellant designed to burn at a rate suitable for attaining initial flight and acceleration of the rocket motor assembly, whereas the propellant of the main motor subassembly is designed to burn at a slower rate for longer periods of time.

In each of the above-discussed applications, certain performance advantages are obtained by designing the multi-stage rocket motor assembly to permit detachment of the launch (or boost) motor subassembly from the main motor and jettisoning of the spent launch motor subassembly after expenditure of the launch motor subassembly propellant. The firing of the main motor subassembly is synchronized with the jettisoning of the launch motor subassembly to achieve a designed flight profile.

SUMMARY OF THE INVENTION

It is an object of this invention to provide a propulsive impulse system of a dual-stage rocket motor that experiences a reduced weight penalty during the flight stage of the rocket motor than known rocket motors so that the performance of the propulsive impulse system is improved in terms of flight duration and/or flight velocity.

In accordance with the principles of this invention, these and other objects are attained by the provision of a rocket motor assembly comprising at least one primary motor subassembly, such as a main or sustain motor subassembly, and at least one launch (or boost) motor subassembly. The primary motor subassembly comprises at least one flight igniter, a main motor case structure housing at least one main combustion chamber loaded with at least one main propellant which is ignitable by the flight igniter, and a nozzle subassembly with a throat portion constructed and arranged to permit combustion products produced by combustion of the main propellant to be received from the main combustion chamber and passed through the throat portion. The launch (or boost) motor subassembly comprises at least one launch igniter and a launch motor case structure, which houses at least one launch combustion chamber loaded with at least one propellant grain which is ignitable by the launch igniter.

The launch motor subassembly is jettisonable, meaning that it is capable of being detached from at least the nozzle subassembly while the rocket motor assembly is in flight to permit the launch motor subassembly to be: separated and ejected from the main motor case structure and the nozzle subassembly substantially simultaneously with or after ignition of the main propellant. According to this invention, the flight igniter is integrated with the launch motor subassembly. As referred to herein, integrated in this context means that the flight igniter is jettisoned essentially in unison with the launch motor subassembly by detachment of the launch motor subassembly from at least the main motor nozzle subassembly.

By jettisoning the flight igniter essentially simultaneously with the launch motor subassembly, the weight of the main motor subassembly is lessened during operation of the flight motor stage, i.e., the flight igniter is removed as a weight penalty. As a result, in the case of an anti-aircraft, anti-tank, and anti-personnel missiles and the like, acceleration and distance traveled during the intercept stage can be increased, thereby improving performance. Likewise, in the case of a boost/sustain missile, because the weight penalty has been decreased during the sustain stage by jettisoning the boost stage, the acceleration and distance, traveled by the missile are increased.

These and other objects, aspects and advantages of the invention will be apparent to those skilled in the art upon reading the specification and appended claims which, when read in conjunction with the accompanying drawings, explain the principles of this invention.

BRIEF DESCRIPTION OF THE DRAWINGS

The principles of this invention are elucidated upon by the following drawings, in which.

DETAILED DESCRIPTION OF THE INVENTION

Figure 1:
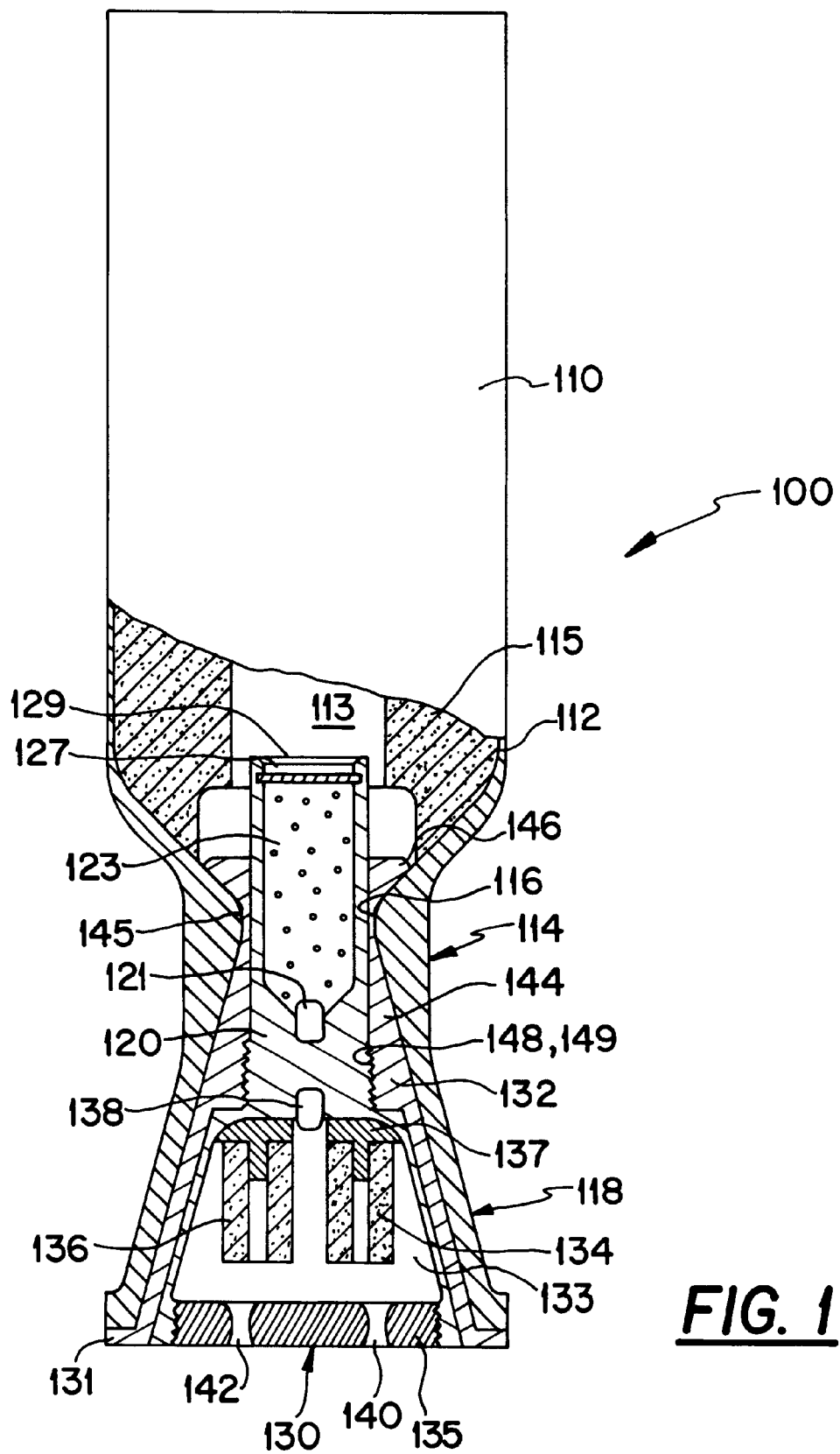
FIG. 1 is a partial sectional view of a multi-stage rocket motor assembly in accordance with one embodiment of this invention.

An embodiment of the invention is illustrated in FIG. 1, which depicts a canister-fired missile in cross-sectional view generally designated by reference numeral 100. The missile 100 includes a main motor subassembly 110 and a jettisonable launch motor subassembly 130.

The main flight motor 10 includes a main motor case structure 112 and a nozzle subassembly 114. In the illustrated embodiment, the nozzle subassembly 114 has a conventional converging/diverging configuration: however, it is to be understood that other nozzle configurations can also be used and fall within the scope of this invention. In the illustrated embodiment, the main motor case structure 112 and the case of the nozzle subassembly 114 are shown to be continuous, although the present invention is not so limited. More specifically, the nozzle subassembly 114 extends from the main motor case structure 112 aftwardly to converge into a throat portion 116 of restricted cross-sectional area, before diverging to form a frustroconical aft end portion 118.

The main motor case structure 112 is provided with a main combustion chamber 113 loaded with a propellant grain 115. As referred to herein, propellant grain 115 (as well as grains 134 and 136 discussed below) can be a self-deflagrating solid propellant grain having oxidizer and fuel components (such as illustrated in FIG. 1), a fuel grain (optionally containing oxidizers in sufficiently small amounts so as not to be self-deflagrating) for a hybrid rocket motor, or an oxidizer grain (optionally containing fuel in sufficiently small amounts so as not to be self-deflagrating) for a reverse-hybrid rocket motor. Although a center-perforated grain is illustrated, it is to be understood that this invention also applies for other grain configurations, including, by way of example, end-burning grains and other configurations well known to those skilled in the art. The main motor case structure 112 commonly also includes insulation layers (not shown) between the solid propellant grain 115 and the case structure 112.

The main flight motor 10 is also provided with a flight igniter 120. The flight igniter 120 includes an initiator 121, such as an electric match or initiator commonly known as a squib and including electric lead wires (not shown) for initiation purposes. The igniter 120 further includes a pyrotechnic material (or igniter charge) 123, which is positioned so that, in operation, the initiator 121 ignites the pyrotechnic material 123 which, in turn, generates and directs hot combustion products onto the surface of the solid propellant grain 115 to initiate burning of the grain 115. Any suitable material may be selected for making the pyrotechnic material 123. A representative, but non-exhaustive, list of pyrotechnic materials 123 include a mixture of magnesium and teflon powder in approximately equal amounts, boron/potassium nitrate ($BKNO_3$), propellant shavings, and/or black powder. A spacer 127 and closure plug 129 are positioned at the forward end of the flight igniter 120 to contain the pyrotechnic material 123 and ensure operative contact of the pyrotechnic material 123 with the initiator 121. The spacer 127 can be made of any suitable material, including foams. The closure plug 129 can be made of any suitable material, including, by way of example, polyethylene.

The launch motor subassembly 130 includes a launch motor case structure 132, which is discussed in more detail below. An exhaust panel 135 is secured within an open aft end of the launch motor case structure 132. The exhaust panel 135 has formed therein nozzles 140 and 142 which, in the illustrated embodiment, are convergent/divergent configuration. The launch motor case structure 132 and exhaust panel 135 define a launch motor combustion chamber 133 loaded with a plurality of propellant grains 134 and 136 and a launch igniter 138 positioned central to the center-perforated propellant grains 134 and 136. (Although two solid propellant grains 134 and 136 are depicted in the sectional view of FIG. 1, it is understood that only one or more than two solid propellant grains can be used. Likewise, the propellants 134 and 136 can be formed of propellant shavings, powder, such as black powder, or the like.)

Pyrotechnic material 137 operatively connects the launch igniter 138 with the propellant grains 134 and 136, so that upon ignition of the launch igniter 138, the pyrotechnic material 137 is ignited and transfers the ignition charge to the central perforation of the propellant grains 134 and 136. Upon ignition of the propellant grains 134 and 136, combustion products are generated and, after sufficient pressure has built up in the launch motor combustion chamber 133, the combustion products are expelled from the launch motor subassembly 130 through nozzles 140 and 142. The dimensions of the launch motor subassembly 130 and the propellant selected for the propellant grains 134 and 136 is dependent upon the intended use of the missile 100.

In the illustrated embodiment, the launch motor case structure 132 comprises a body portion 144, a neck portion 145, and a lip portion 146, which are preferably integrally formed and collectively constitute a sleeve. Representative materials from which the sleeve can be made include polyethylene, phenolics, metals, and combinations thereof. The body portion 144 has an outer surface which conforms to and abuts against an inner surface of the aft end portion 118 of the nozzle subassembly 114. In the illustrated embodiment, the outer surface of the body portion 144 is frustroconical. The diameter of the outer surface of the body portion 144 is larger than the diameter of the throat portion 116 (and the body portion 144 is made of a material or materials of sufficient strength and rigidity) to prevent the body portion 144 from passing through the throat portion 116 due to the propulsive force imparted by the firing of grains 134 and 136. Optionally, radially extending annular rim 131 may be employed to prevent the body portion 144 from advancing towards the throat portion 116. When inserted into the main motor case structure 112, the neck portion 145 extends through the throat portion 116 and has an outer diameter which substantially conforms in diameter and contour to an inner diameter of the throat portion 116. The lip portion 146 is defined by a plurality of circumferentially spaced fingers extending axially forward of the neck portion 145. The outer surfaces of diametrically opposed ones of the fingers of the lip portion 146 define an outer diameter which is greater than the diameter of the throat portion 116, to detachably retain the body portion 144 in the nozzle subassembly 114. Preferably, the outer surfaces of the fingers of the lip portion 146 conform to and abut against a portion of the nozzle subassembly 114 forward of the throat portion 116. The fingers of the lip portion 146 are elastically flexible in a radial inward direction by a sufficient distance to permit insertion of the lip portion 146 through the throat portion 116 (along a forward direction) during installation of the launch motor case structure 132 in the nozzle subassembly 114. The forward outer edges of the fingers are preferably beveled to more easily effect clearance of the fingers with respect to the throat portion 116 during insertion. After insertion of the case structure 132, the fingers of the neck portion 145 preferably elastically expand to return to their original positions so that the fingers collectively define an outer diameter that is larger than the inner surface of the throat portion 116. A system similar to the fingers of the lip portion 146 explained above and illustrated in the accompanying FIGS. is known in connection with a different application, i.e., for a removable rocket motor igniter system of a single stage rocket motor, described in U.S. Pat. Nos. 5,007,236 and 5,062,206, the disclosures of which are incorporated herein by reference.

The launch motor case structure 132 can be formed, by way of example, of polypropylene. However, any other suitable material such as a suitable metal may be used, and the material may be fabricated by any other suitable process such as machining in addition to injection molding.

The flight igniter 120 is received within a central bore of the annular sleeve of the launch motor case structure 132. Complementary threads 148, 149 formed on the launch motor case structure 132 and the flight igniter 120, respectively, connect the flight igniter 120 to the launch motor case structure 132. Additional or alternative means, such as other mechanical-type fasteners well known in the art, can be used to connect the flight igniter 120 to the launch motor case structure 132.

Although not shown, o-rings or other suitable sealing devices can be provided between the main motor case structure 112 and the launch motor case structure 132, as well as between the flight igniter 120 and the launch motor case structure 132, to provide sealing engagement therebetween.

During the launch stage of operation, the launch igniter 138 is activated to generate hot gases, which contact and ignite the propellant grains 134 and 136. Upon ignition of the propellant grains 134 and 136, combustion products are generated and, after sufficient pressure has built up in the launch motor combustion chamber 133, expelled from the launch motor subassembly through the nozzles 140 and 142. The interfacial contact between the frustroconical body portion 144 of the launch motor case structure 132 and the aft end exhaust portion 118 of the nozzle subassembly 114 retains the launch motor case structure 132 and the launch motor subassembly 130 in place during launch.

The initiation of the main propellant grain 115 by the flight igniter 120 is usually timed to substantially coincide with or occur subsequent to the depletion of the launch propellant grains 134 and 136. When burning of the main propellant grain 115 is initiated, combustion products are generated, thereby building up internal pressures within the main combustion chamber 113. The initiation of the main propellant grain 115 and jettisoning of the launch motor subassembly 130 should not be performed prematurely, or else the jettisoned launch motor subassembly 130 might pursue and strike the main flight motor 10 in flight.

The capability of the rocket motor assembly 100 to jettison its launch motor subassembly 130 is accomplished by the provision of the fingers of the lip portion 146 of the launch motor case structure 132 and/or the presence of the complementary threads 148 and 149. Upon actuation of the main flight motor 110 by the flight igniter 120, the flight igniter 120 is initially retained in place by both the threads 148 and 149 and the contact between the fingers and the converging throat portion 116. In order to improve motor performance, the flight igniter 120 is preferably maintained in its ignition position (illustrated in FIG. 1) for a sufficient amount of time after ignition of the main propellant 115 to act as a nozzle closure and thereby build up internal pressure in the main rocket motor 110. The fingers (and/or neck portion 145) are sufficiently frangible and are of an appropriate thickness so that after a predetermined internal pressure has been achieved, the fingers (or neck portion 145) fail structurally, e.g., break or splinter, and/or the complementary threads 148 and 149 fail due to shearing. The structural failure of the neck, fingers and/or complementary threads causes the launch motor subassembly 130 to be jettisoned. The neck portion 145 and the fingers of the lip portion 146 should not be so thin as to rupture prematurely.

Due to the integration of the flight igniter 120 with the launch motor case structure 132, the flight igniter 120 and launch motor subassembly 130 are jettisoned essentially in unison. As referred to herein, integrated in this context means that the flight igniter 120 is jettisoned essentially in unison with the launch motor subassembly 130 by detachment of the launch motor subassembly 130 from at least the nozzle subassembly 114, i.e., by structural failure of the lip portion 146 (and/or neck portion 145) and/or shear at threads 148 and 149 a, described above. In the illustrated embodiment, the flight igniter 120 is integrated with the launch motor case structure 132 by complementary screw threads 148, 149). It is understood that other joining techniques, such as conventional mechanical fasteners or integral connections can be used and fall within the meaning of integrated as used herein, so long as the flight igniter 120 is jettisoned in unison with the launch motor subassembly 130.

The provision of the frangible fingers of the lip portion 146 and the complementary threads 148 and 149 for attaining the jettison operation is but one example of a system which is suitable for use and encompassed within the scope of this invention. It is to be understood that the present invention encompasses other mechanisms and systems known in the art for connecting a jettisonable stage or component in a detachable manner, including, without limitation, quick-release latches, separating pistons, and explosive bolts. It would be within the purview of a person of ordinary skill in the art, having reference to this disclosure, to make and use such mechanisms and systems using known engineering principles. For this reason, such jettison mechanisms and systems will not be further discussed herein.

In the embodiment illustrated in FIG. 1, the launch motor subassembly 130 e.g., the propellant grains 134 and 136 and the launch motor combustion chamber 133 is housed substantially in its entirety in the nozzle subassembly 114. The term substantially is used here because, as shown in FIG. 1, a mating member of the launch motor case structure 132 may be positioned slightly aft of the nozzle subassembly 114 for facilitating mating of the nozzle subassembly 114 with the launch motor subassembly 130. As a consequence, the overall length of the missile 100 is not increased substantially by the presence of the launch motor subassembly 130. Additionally, jettison of the launch motor subassembly 130 does not alter the external shape of the missile 100. Thus, aerodynamic instability and control problems that plague conventional jettisonable systems are avoided.

Figure 2:
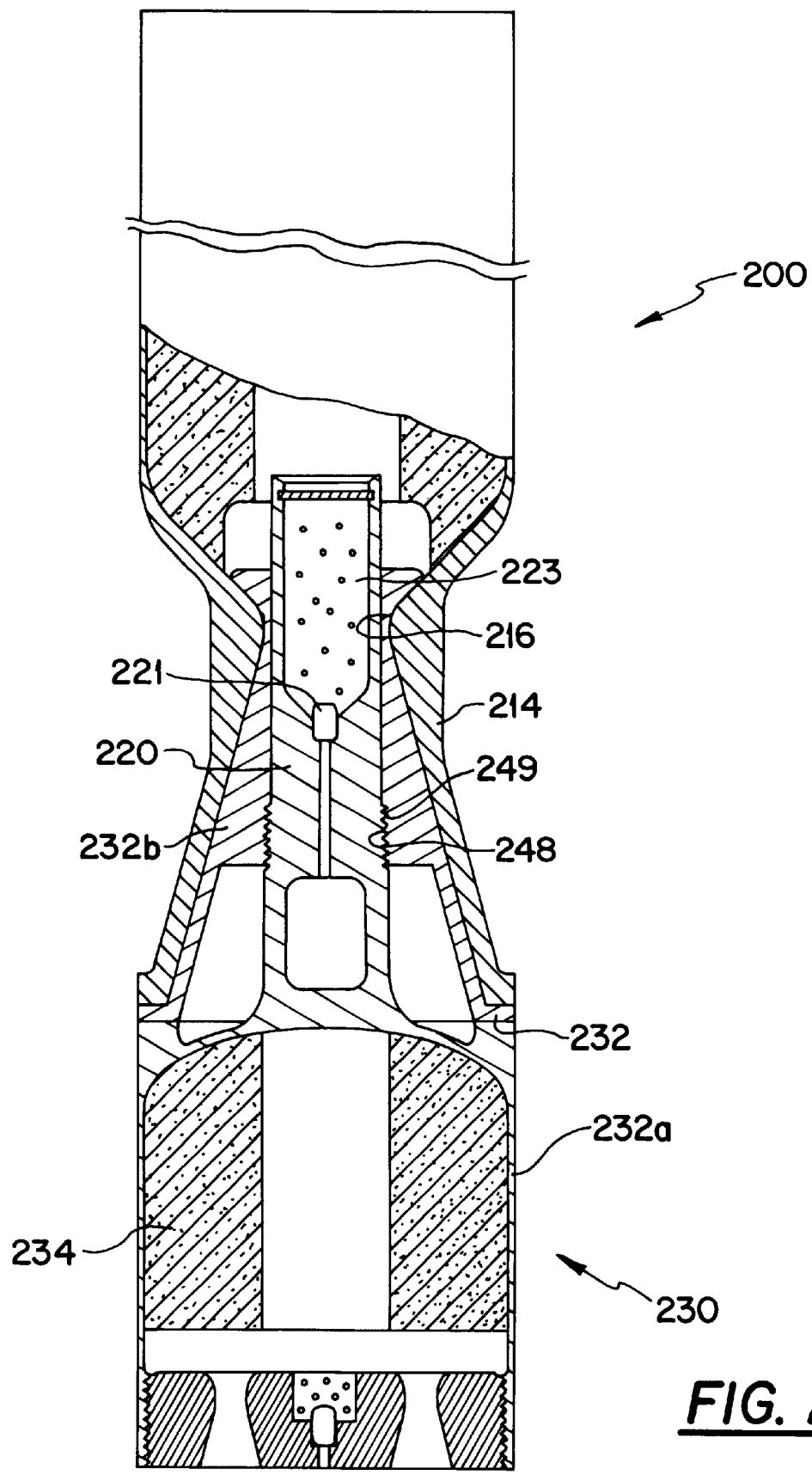
FIG. 2 is a partial sectional view of a multi-stage rocket motor assembly in accordance with another embodiment of this invention.

FIG. 2 illustrates another embodiment of a rocket motor assembly 200 of this invention, in which the launch motor subassembly 230 is only partially housed in nozzle subassembly 214. The launch motor case structure 232 includes an external portion 232a and an internal portion 232b. The external portion 232a is positioned aft of the nozzle subassembly 214 and houses launch propellant grain 234, whereas the internal portion 232b is disposed within the nozzle subassembly 214 and extends through throat portion 216 of the rocket motor assembly 200. The igniter 220 with pyrotechnic material 223 and initiator 221 is received by and integrated with the launch motor case structure 232, such as by complementary threads 248, 249. The launch motor subassembly 230 is jettisoned in unison with flight igniter 220 from the main flight motor 210 in a manner similar to that of the embodiment of FIG. 1. The construction shown in FIG. 2 may be advantageous for missiles carrying heavier payloads and for larger, non-canister launched rockets in which reduction of longitudinal length is not imperative, or for boost/sustain motors.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to: the precise embodiments disclosed. Modifications and equivalents will be apparent to practitioners skilled in this art and are encompassed within the spirit and scope of the appended claims.

We claim:

1. A multi-stage rocket motor assembly comprising:
    at least one main motor subassembly comprising at least one flight igniter, a main motor case structure containing at least one main combustion chamber loaded with at least one main propellant which is ignitable by said flight igniter, and a nozzle subassembly defining a combustion product passage in communication with said combustion chamber, said combustion product passage including a throat portion and an aft exhaust portion; and
    at least one launch motor subassembly comprising at least one launch igniter and a launch motor case structure, said launch motor case structure housing at least one launch combustion chamber loaded with at least one launch propellant which is ignitable by said launch igniter, said launch motor subassembly and said nozzle subassembly being detachably connected to permit both detachment of said launch motor subassembly from at least said nozzle subassembly while said rocket motor assembly is in flight and jettisoning of said launch motor subassembly after initiation of said main propellant,
    wherein said flight igniter is integrated with said launch motor subassembly to permit said flight igniter to be jettisoned essentially in unison with said launch motor subassembly, and
    wherein said launch motor subassembly does not extend substantially beyond said aft end portion of said nozzle subassembly.

2. The rocket motor assembly of claim 1, wherein said main propellant comprises a hybrid system comprising at least one solid fuel and at least one liquid oxidizer.

3. The rocket motor assembly of claim 1, wherein said main propellant comprises a reverse hybrid system comprising at least one solid oxidizer and at least one liquid fuel.

4. The rocket motor assembly of claim 1, wherein said main motor subassembly comprises a sustain motor subassembly and wherein said launch motor subassembly comprises a boost motor subassembly.

5. The rocket motor assembly of claim 1, wherein said main propellant and said launch propellant each comprise a respective solid propellant grain.

6. The rocket motor assembly of claim 1, wherein said launch motor case structure extends through and is detachably retained by the throat portion of the nozzle subassembly.

7. A multi-stage rocket motor assembly comprising:
    at least one main motor subassembly comprising at least one flight igniter, a main motor case structure containing at least one main combustion chamber loaded with at least one main propellant which is ignitable by said flight igniter, and a nozzle subassembly defining a combustion product passage in communication with said combustion chamber, said combustion product passage including a throat portion and an aft exhaust portion; and
    at least one launch motor subassembly comprising at least one launch igniter and a launch motor case structure, said launch motor case structure housing at least one launch combustion chamber loaded with at least one launch propellant which is ignitable by said launch igniter, said launch motor subassembly and said nozzle subassembly being detachably connected for detaching said launch motor subassembly from at least said nozzle subassembly while said rocket motor assembly is in flight and for jettisoning said launch motor subassembly after initiation of said main propellant,
    wherein said flight igniter is integrated with said launch motor subassembly for jettisoning said flight igniter essentially in unison with said launch motor subassembly, and
    wherein said launch combustion chamber and said launch propellant are substantially housed in said main motor subassembly.

8. The rocket motor assembly of claim 7, wherein said main propellant comprises a hybrid system comprising at least one solid fuel and at least one liquid oxidizer.

9. The rocket motor assembly of claim 7, wherein said main propellant comprises a reverse hybrid system comprising at least one solid oxidizer and at least one liquid fuel.

10. The rocket motor assembly of claim 7, wherein said main motor subassembly comprises a sustain motor subassembly and wherein said launch motor subassembly comprises a boost motor subassembly.

11. The rocket motor assembly of claim 7, wherein said main propellant and said launch propellant each comprise a respective solid propellant grain.

12. The rocket motor assembly of claim 7, wherein said launch motor case structure extends through and is detachably retained by the throat portion of the nozzle subassembly.

13. A multi-stage rocket motor assembly comprising:
    at least one main motor subassembly comprising at least one flight igniter, a main motor case structure containing at least one main combustion chamber loaded with at least one main propellant which is ignitable by said flight igniter, and a nozzle subassembly defining a combustion product passage in communication with said combustion chamber, said combustion product passage including a throat portion and an aft exhaust portion; and
    at least one launch motor subassembly comprising at least one launch igniter and a launch motor case structure, said launch motor case structure housing at least one launch combustion chamber loaded with at least one launch propellant which is ignitable by said launch igniter, said launch motor subassembly and said nozzle subassembly being detachably connected for detaching said launch motor subassembly from at least said nozzle subassembly while said rocket motor assembly is in flight and for jettisoning said launch motor subassembly after initiation of said main propellant, wherein said flight igniter is integrated with said launch motor subassembly for jettisoning said flight igniter essentially in unison with said launch motor subassembly, and wherein said launch motor case structure extends through and is detachably retained by the throat portion of the nozzle subassembly.

14. The rocket motor assembly of claim 13, wherein said main propellant comprises a hybrid system comprising at least one solid fuel and at least one liquid oxidizer.

15. The rocket motor assembly of claim 13, wherein said main propellant comprises a reverse hybrid system comprising at least one solid oxidizer and at least one liquid fuel.

16. The rocket motor assembly of claim 13, wherein said main motor subassembly comprises a sustain motor subassembly and wherein said launch motor subassembly comprises a boost motor subassembly.

17. The rocket motor assembly of claim 13, wherein said main propellant and said launch propellant each comprise a respective solid propellant grain.

* * * * *